Aug. 16, 1927.
W. G. SHEDENHELM
PULLEY BLOCK
Filed May 17, 1926
1,639,439
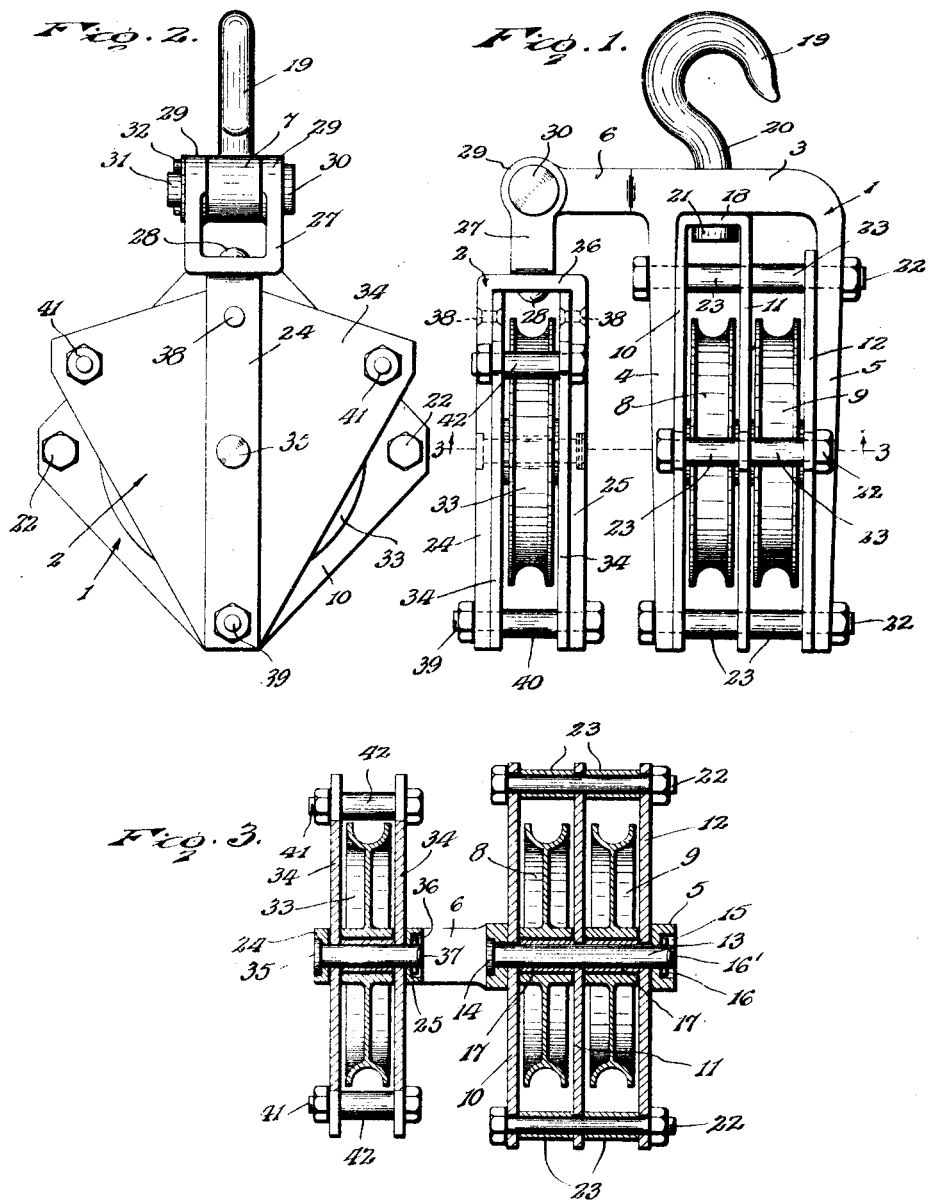

Patented Aug. 16, 1927.

1,639,439

UNITED STATES PATENT OFFICE.

WILLIAM G. SHEDENHELM, OF TIFFIN, OHIO.

PULLEY BLOCK.

Application filed May 17, 1926. Serial No. 109,708.

This invention relates to pulley blocks and more particularly to a pulley block adapted to be connected with an elevated support while lifting a heavy load through the medium of companion pulley blocks and a cooperating rope or cable. One object of the invention is to provide a pulley block including a main frame and an auxiliary frame pivotally connected therewith so that it may be swung and turned relative to the main housing and the rope or cable prevented from binding or slipping out of proper engagement with a pulley wheel in the auxiliary housing.

Another object of the invention is to so mount the auxiliary frame that it may have free swinging and turning movement relative to the main housing without the main housing being moved out of proper engagement with its support or out of proper angular relation to a lower load engaging pulley block.

Another object of the invention is to provide a pulley block which will be very strong and durable and may be subjected to rough use without being damaged.

This invention is illustrated in the accompanying drawing, wherein,—

Figure 1 is a view showing the improved pulley block in side elevation,

Figure 2 is a view showing the pulley block in end elevation, and

Figure 3 is a transverse sectional view taken along the line 3—3 of Figure 1.

The pulley block forming the subject matter of this invention constitutes the upper pulley block of a block and tackle and when in use, is suspended from an elevated support. It includes a main housing or frame indicated in general by the numeral 1 and an auxiliary frame or housing, indicated in general by the numeral 2. The main frame is formed of metal and is provided with a cross head 3 from which extend depending arms 4 and 5 which preferably taper towards their lower ends, as shown in Figure 1. The cross head 3 projects beyond the depending arm 4 to provide a side arm 6 which terminates at its free end in a head 7 constituting a bearing.

The pulley wheels 8 and 9 which are rotatably mounted in the main frame for engagement by flights of the hoisting rope or cable with which the pulley block is to be employed are disposed between plates 10, 11 and 12, and are rotatably mounted through the medium of a common axle 13 which passes through the hubs of the pulley wheels and through registering openings formed in the arms 4 and 5 and plates 10 and 12, as shown in Figure 3. Referring to this figure, it will be seen that the head 14 of the axle is countersunk in the arm 4 and that the other end portion of the axle projects into a pocket 15 formed in the outer face of the arm 5 and carries a washer 16 and cotter pin, or other suitable fastener 16′. Sleeves or bushings 17 are placed upon the axle within the hubs of the pulley wheels to prevent undue wear upon the axle and pulley wheels, and since the axle is removably secured, it will be seen that the bushing may be readily renewed when necessary. At their upper ends the plates 10 and 11 are joined by a bridge 18 which fits against the under face of the cross head 3 and is formed with an opening registering with an opening forged through the cross head. A hook 19, by means of which the block is to be suspended from an elevated support, has its shank 20 passed through the registering opening from the cross head and bridge and at its lower end is formed with a head 21 which engages the bridge and serves to assist in retaining the plates 10 and 11 in proper position.

Referring to Figure 2 it will be seen that the plates 10, 11 and 12 are substantially rectangular in shape and so disposed in the frame that portions of the plates extend from opposite sides thereof, and serve to completely shield the pulley wheels. Bolts 22 pass through alined openings formed in the corner portions of the plates and carry spacing sleeves 23 which are disposed between the plates and securely hold the plates in proper spaced relation to each other with the plates 10 and 12 in close contacting engagement with the inner faces of the depending arms 4 and 5. The bolts which pass through the upper and lower corner portions of the plates are longer than those which pass through the side corners and pass through openings formed in the upper and lower end portions of the depending frame bars. The last-mentioned bolts will therefore, serve very effectively to secure the plates stationary in the frame. It will be also noted that the bolts are spaced from the peripheral edges of the pulleys and will serve very effectively to drive the rope or cable into and out of engagement with the pulleys.

The auxiliary frame or housing is also formed of metal and includes side arms 24 and 25 joined at their upper ends by a cross head 26. A suspending yoke 27 is swiveled to the cross head 26 by a rivet or other suitable fastener 28 and has its arms extending upwardly and terminating in bearing heads 29 which fit against opposite ends of the bearing heads 7 and receive a pivot pin 30 passed through the bearing 7. The pivot pin 30 is formed with a head at one end and at its other carries a washer 31 and cotter pins, or other removable fastener 32. By having the frame swiveled to the support, or yoke 27, and this yoke pivoted to the outer end of the arm 6, it will be possible to swing the auxiliary frame towards and away from the main frame and also turn it about the axis of the rivet 28. Therefore, the auxiliary frame may be readily moved to accommodate itself to the angle at which the portions of the rope or cable being pulled upon, is extended, and the rope or cable will be prevented from having a tendency to move transversely out of engagement with the pulley wheel 33 and also prevent the rope or cable from being worn by frictional engagement with the auxiliary frame. The pulley wheel 33 fits between side plates 34 which fit against the inner faces of the side arms 24 and 25 and is rotatably mounted through the medium of an axle 35. The axle 35 is similar to the axle 15 and passes through the hub of the pulley wheel and through registering openings formed in the side plates and arms of the frame. At one end it is formed with a head countersunk in the arm 24 and its other end portion projects into a recess formed in the arm 25 and carries a washer 36 and cotter pin or other suitable fastener 37. The side plates of the auxiliary frame or housing are substantially triangular in shape and have their upper end portions secured to the arms 24 and 25 by rivets 38 and their tapered lower end portions drawn by a bolt 39 which passes through the lower end portions of the side arms and carries a spacing sleeve 40 to hold the lower ends of the plates in proper spaced relation to each other and in close contact engagement with the side arms. The rivets 38 and bolts 39 will, therefore, serve to very securely hold the plates in engagement with the side arms of the auxiliary frame. Other bolts 41 pass through alined openings in the extended side portions of the plates in spaced relation to the periphery of the pulley wheels and carry sleeves 42 to retain the plates in proper spaced relation to each other. It will therefore, be seen that the pulley block is entirely formed of metal and may stand rough usage without danger of being broken.

When the pulley block is in use a rope or cable is attached to a companion pulley block of any suitable formation and after being engaged with the pulley wheel 9 between the plates 11 and 12, is trained about a pulley wheel of the companion block. The rope is then trained about the pulley wheel 8 and engaged with a second pulley wheel of the companion block and carried upwardly and engaged with the pulley wheel 33 of the auxiliary housing or frame. The suspending hook 19 may now be engaged with an elevated support and the companion pulley secured to the load to be lifted and the free end portions of the rope or cable drawn upon to effect lifting of the load. Since the auxiliary frame or housing is pivotally and turnably connected with the arm 6 it will be apparent that the person or persons pulling upon the hoisting rope may stand almost directly beneath the upper pulley block or at some distance therefrom in practically any direction desired and when strain is applied to the hoisting rope the auxiliary casing will swing away from the main frame or turn about the rivet 28 and accommodate itself through the angle at which the hoisting rope extends downwardly from the arm 6. The hoisting rope will therefore, be prevented from being dragged transversely out of proper engagement with the pulley wheel 33 and also be prevented from scraping against the side of the auxiliary frame and becoming worn by friction.

It will also be practically impossible for the rope to slip transversely off of the pulley 33 and become jammed between the pulley and one of the side plates of the auxiliary frame, and it will be a great deal easier for the workmen to draw upon the rope and lift a heavy load.

Having thus described the invention, I claim:

1. A pulley block comprising a main frame, an auxiliary frame disposed at one side of said main frame, a hanger having its lower end swiveled to said auxiliary frame and its upper end pivotally connected with said main frame for swinging toward and away from the same, and pulleys rotatably carried by said frames.

2. A pulley block comprising a main frame, a depending support pivotally connected with said main frame for swinging movement towards and away from the same, an auxiliary frame swiveled to and depending from said support, and pulleys rotatably mounted in said frames.

3. A pulley block comprising a main frame, an arm extending transversely from said frame, a depending support pivoted to said arm to swing towards and away from said frame, an auxiliary frame swiveled to said support and depending therefrom, and pulleys rotatably mounted in said frames.

4. A pulley block comprising a main frame, an arm extending transversely from said frame, an auxiliary frame pivotally connected with said arm and adapted to turn about an axis extending longitudinally of the main frame and swing towards and away from one side of said main frame, and pulleys rotatably mounted in said frames.

In testimony whereof I affix my signature.

WILLIAM G. SHEDENHELM. [L. S.]